US010040045B2

United States Patent
Crnkovic et al.

(10) Patent No.: US 10,040,045 B2
(45) Date of Patent: Aug. 7, 2018

(54) FCC UNITS, SEPARATION APPARATUSES, AND METHODS FOR SEPARATING REGENERATED CATALYST

(71) Applicant: UOP LLC, Des Plaines, IL (US)

(72) Inventors: Miladin Crnkovic, Des Plaines, IL (US); Paolo Palmas, Des Plaines, IL (US); Richard A. Johnson, II, Algonquin, IL (US); Thomas William Lorsbach, Austin, TX (US)

(73) Assignee: UOP LLC, Des Plaines, IL (US)

( * ) Notice: Subject to any disclaimer, the term of this patent is extended or adjusted under 35 U.S.C. 154(b) by 151 days.

(21) Appl. No.: 14/448,933

(22) Filed: Jul. 31, 2014

(65) Prior Publication Data

US 2016/0030906 A1 Feb. 4, 2016

(51) Int. Cl.
| | | |
|---|---|---|
| *B01J 8/26* | (2006.01) | |
| *B01J 8/00* | (2006.01) | |
| *B01J 8/18* | (2006.01) | |
| *C10G 11/18* | (2006.01) | |
| *B01J 38/12* | (2006.01) | |
| *B01J 29/90* | (2006.01) | |

(52) U.S. Cl.
CPC ........... *B01J 8/0015* (2013.01); *B01J 8/0055* (2013.01); *B01J 8/1827* (2013.01); *B01J 8/26* (2013.01); *B01J 29/90* (2013.01); *B01J 38/12* (2013.01); *C10G 11/182* (2013.01); *B01J 2208/00752* (2013.01); *B01J 2208/00761* (2013.01); *B01J 2208/00991* (2013.01)

(58) Field of Classification Search
CPC .............. B01J 8/26; B01J 38/12; B01J 29/90
See application file for complete search history.

(56) References Cited

U.S. PATENT DOCUMENTS

| | | | |
|---|---|---|---|
| 2,543,863 A | 3/1951 | Martin | |
| 2,902,432 A | 9/1959 | Codet et al. | |
| 3,903,016 A | 9/1975 | Owen | |
| 3,958,953 A | 5/1976 | Luckenbach | |
| 4,211,637 A * | 7/1980 | Gross | ........... C10G 11/187 208/164 |
| 4,478,708 A | 10/1984 | Farnsworth | |
| 4,556,540 A | 12/1985 | Benslay | |
| 4,615,992 A | 10/1986 | Murphy | |

(Continued)

FOREIGN PATENT DOCUMENTS

| | | |
|---|---|---|
| CN | 103121889 A | 5/2013 |
| WO | 1991000899 A1 | 1/1991 |

OTHER PUBLICATIONS

Search Report dated Oct. 22, 2015 for corresponding PCT Appl. No. PCT/US2015/038452.

*Primary Examiner* — Aileen B Felton

(57) ABSTRACT

Apparatuses and methods for separating regenerated catalyst are provided. In one embodiment, an apparatus for separating regenerated catalyst includes a regeneration vessel including a catalyst bed section. The apparatus includes a catalyst settler physically separated from the catalyst bed section by a wall extending within the regeneration vessel. The catalyst overflowing the catalyst bed section flows over the wall and enters the catalyst settler. The apparatus further includes a pipe in fluid communication with the catalyst settler and configured to deliver regenerated catalyst from the regeneration vessel to another vessel.

9 Claims, 3 Drawing Sheets

(56) References Cited

U.S. PATENT DOCUMENTS

| | | |
|---|---|---|
| 5,198,397 A | 3/1993 | Raterman |
| 5,288,397 A | 2/1994 | Markham et al. |
| 6,503,460 B1 | 1/2003 | Miller et al. |
| 7,077,998 B2 | 7/2006 | Wu et al. |
| 8,088,335 B2 | 1/2012 | Long |
| 8,323,477 B2 | 12/2012 | Couch et al. |
| 8,575,053 B2 | 11/2013 | Mehlberg et al. |

* cited by examiner

FCC UNITS, SEPARATION APPARATUSES, AND METHODS FOR SEPARATING REGENERATED CATALYST

TECHNICAL FIELD

The present disclosure generally relates to fluid catalytic cracking (FCC) units, separation apparatuses, and methods for separating regenerated catalyst, and more particularly relates to FCC units, separation apparatuses, and methods for separating regenerated catalyst from entrained gases within a regeneration vessel.

BACKGROUND

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds, substantial amounts of highly carbonaceous material, referred to as coke, are deposited on the catalyst to provide coked or carbonized catalyst. This carbonized catalyst is often referred to as spent catalyst. In conventional processing, vaporous products are separated from the carbonized catalyst in a reactor vessel. Carbonized catalyst may be subjected to stripping in the presence of a gas such as steam to strip entrained hydrocarbonaceous gases from the carbonized catalyst.

The carbonized catalyst is regenerated before catalytically cracking more hydrocarbons in the presence of the catalyst. Regeneration occurs by oxidation of the carbonaceous deposits to carbon oxides and water. To regenerate the carbonized catalyst, the carbonized catalyst is introduced into a fluidized bed at the base of the regenerator, and oxygen-containing combustion air is passed upwardly through the bed. After regeneration, the regenerated catalyst is returned to the riser.

Entrained gases are generally present along with the regenerated catalyst after regeneration. The entrained gases may include inert gases such as nitrogen, or corrosive gases such as carbon monoxide, carbon dioxide, and oxygen. Conventional processing feeds the regenerated catalyst with the entrained gases to the reactor vessel. As a result, the reactor vessel may be required to process increased amounts of material and may be negatively impacted by corrosive entrained gases.

Accordingly, it is desirable to provide FCC units, separation apparatuses, and methods for separating regenerated catalyst from entrained gases. In addition, it is desirable to provide apparatuses and methods for separating entrained gases from regenerated catalyst within a regeneration vessel before the regenerated catalyst exits the regeneration vessel. Furthermore, other desirable features and characteristics will become apparent from the subsequent detailed description and the appended claims, taken in conjunction with the accompanying drawings and this background.

BRIEF SUMMARY

Fluid catalytic cracking units, separation apparatuses, and methods for separating regenerated catalyst from entrained gases are provided herein. In an exemplary embodiment, an apparatus for separating regenerated catalyst includes a regeneration vessel including a catalyst bed section. The apparatus includes a catalyst settler physically separated from the catalyst bed section by a wall extending within the regeneration vessel. The catalyst overflowing the catalyst bed section flows over the wall and enters the catalyst settler. The apparatus further includes a pipe in fluid communication with the catalyst settler and configured to deliver regenerated catalyst from the regeneration vessel to another vessel.

In accordance with another exemplary embodiment, a fluid catalytic conversion unit includes a reactor vessel configured to process a hydrocarbon feed in a reaction over a regenerated catalyst, wherein the reaction forms a product and spent catalyst. The apparatus includes a regeneration vessel in fluid communication with the reactor vessel to receive the spent catalyst therefrom and to deliver the regenerated catalyst thereto. The regeneration vessel is configured to regenerate the spent catalyst to form the regenerated catalyst. The apparatus further includes a catalyst settler located in the regeneration vessel and configured to separate entrained gas from the regenerated catalyst.

In accordance with a further exemplary embodiment, a method for separating regenerated catalyst from entrained gases is provided. The method includes regenerating spent catalyst in a catalyst regeneration bed bound by a settler wall. The method also includes receiving regenerated catalyst flowing from the regeneration bed over the settler wall into a catalyst settler. The method further includes separating the entrained gas from the regenerated catalyst in the catalyst settler and delivering the regenerated catalyst from the catalyst settler to another vessel.

BRIEF DESCRIPTION OF THE DRAWINGS

Various embodiments will hereinafter be described in conjunction with the following drawing figures, wherein like numerals denote like elements, and wherein.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The various embodiments described herein relate to fluid catalytic cracking (FCC) units, separation apparatuses, and methods for separating regenerated catalyst. Specifically, embodiments described herein are provided to separate regenerated catalyst from entrained gas or gases. In conventional FCC processing, regenerated catalyst is removed directly from a bubbling catalyst bed environment in a regeneration vessel and is fed to a reactor vessel. Entrained gases are generally present along with the regenerated catalyst. Such entrained gases include inert gases, for example, nitrogen. Processing of regenerated catalyst in the presence of entrained gases increases the burden on the gas concentration unit in the FCC unit because of the increased volume of material processed. Also, the entrained gases may include carbon monoxide, carbon dioxide, and oxygen. These gases may increase corrosion and wear on the FCC equipment, reducing the reliability of the operation and increasing the amount of amine needed in the sulfur removal process.

Unlike conventional processing, embodiments of the apparatuses and methods provided herein separate entrained gases from the regenerated catalyst. Specifically, embodiments provided herein separate the entrained gases from the regenerated catalyst before the regenerated catalyst is removed from the regeneration vessel. The separated regenerated catalyst may then be fed, without the entrained gases, to the reactor vessel or another vessel for further processing. Certain embodiments include a catalyst settler that is physically separated from a catalyst bed section within the regeneration vessel. In such embodiments, catalyst overflowing the bubbling catalyst bed environment flows into the adjacent catalyst settler, which provides an entrained gas separation zone. The regenerated catalyst in the catalyst settler may be mechanically agitated, such as by flowing downward into contact with baffles and/or through packing. Additionally or alternatively, the regenerated catalyst in the catalyst settler may be agitated by being contacted and/or impacted by inert gas, such as nitrogen, that is injected into the catalyst separator. Agitation of the regenerated catalyst in the gas separation zone provides for detrainment of the gases from the regenerated catalyst.

Figure 1:
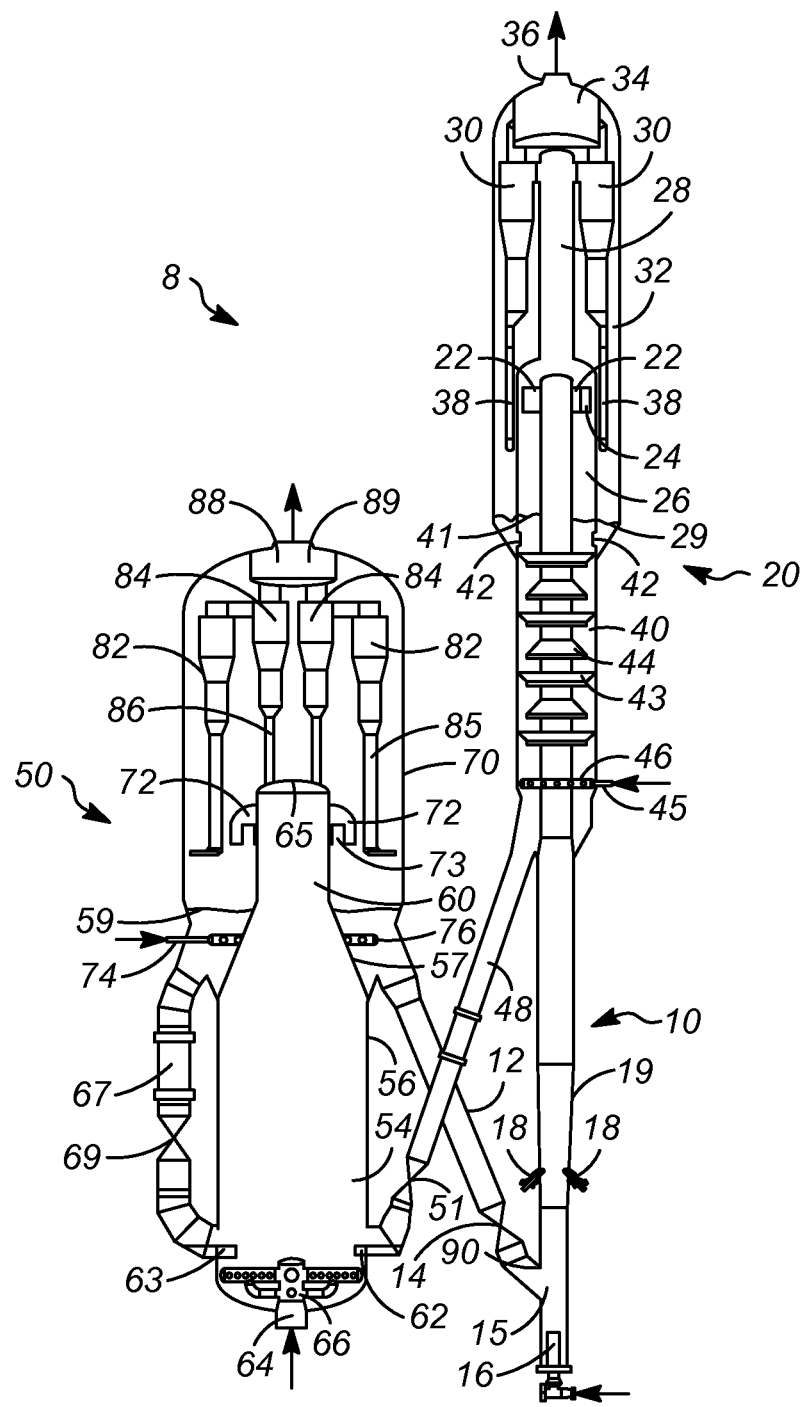
FIG. 1 is a schematic diagram of an exemplary fluid catalyst cracking (FCC) unit including a reactor vessel and a regeneration vessel in accordance with an embodiment herein.

Exemplary apparatuses and methods for separating regenerated catalyst may be useful in any catalyst regeneration process. However, ready usefulness is found in an FCC unit. FIG. 1 shows an exemplary FCC unit 8 that includes a reactor vessel 20 and a regeneration vessel 50. A regenerated catalyst conduit 12 transfers regenerated catalyst from the regeneration vessel 50 to the reactor vessel 20. As described below in relation to FIGS. 2 and 3, the apparatuses and methods for separating regenerated catalyst process the regenerated catalyst before it exits the regeneration vessel 50 and enters the regenerated catalyst conduit 12. While exemplary structures and processes are described below in relation to the FCC unit 8 of FIG. 1, such structures and processes are described for background to the apparatuses and methods of FIGS. 2 and 3, which are not limited to the embodiment of FIG. 1.

In FIG. 1, the regenerator catalyst conduit 12 transfers regenerated catalyst from the regeneration vessel 50 at a rate regulated by a control valve 14 to a reactor riser 10 through a regenerated catalyst inlet 15. A fluidization medium such as steam from a nozzle 16 urges a stream of catalyst upwardly through the riser 10 at a relatively high density. A plurality of feed distributors 18 inject feed across the flowing stream of catalyst particles to distribute hydrocarbon feed to the riser 10. The feed distributors 18 are located on a frustum 19 of the riser. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable feeds. The most common of such conventional feedstocks is a "vacuum gas oil" (VGO), which is typically a hydrocarbon material having a boiling range of from about 343° to about 552° C. prepared by vacuum fractionation of atmospheric residue. Such a fraction is generally low in coke precursors and heavy metal contamination which can serve to contaminate catalyst. Heavy hydrocarbon feedstocks that may be processed include heavy bottoms from crude oil, heavy bitumen crude oil, shale oil, tar sand extract, deasphalted residue, products from coal liquefaction, atmospheric and vacuum reduced crudes. Heavy feedstocks that may be processed also include mixtures of the above hydrocarbons and the foregoing list is not comprehensive. It is also contemplated that lighter recycle or previously cracked feeds such as naphtha may be a suitable feedstock.

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 that effects partial separation of gases from the catalyst. A transport conduit 28 carries the hydrocarbon vapors, including stripped hydrocarbons, stripping media and entrained catalyst to one or more cyclones 30 in the reactor vessel 20 which separates carbonized catalyst from the hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via a bed 41. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion of the carbonized catalyst leaves the disengaging vessel 26 of the reactor vessel 20 through a spent catalyst conduit 48 and passes into the regeneration vessel 50 at a rate regulated by a slide valve 51. The riser 10 of the FCC process is maintained at high temperature conditions which generally include a temperature above about 425° C. In an embodiment, the reaction zone is maintained at cracking conditions which include a temperature of from about 480° to about 621° C. at the riser outlet port 24 and a pressure of from about 69 to about 517 kPa (ga) but typically less than about 275 kPa (ga). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to from about 2 to about 35 wt % of feed. Typically, however, the steam rate will be between about 2 and about 7 wt % for maximum gasoline production and about 10 to about 15 wt % for maximum light olefin production. The average residence time of catalyst in the riser may be less than about 5 seconds. The type of catalyst employed in the process may be chosen from a variety of commercially available catalysts. A catalyst comprising a zeolitic material such as Y Zeolite is preferred, but the older style amorphous catalysts can be used if desired. Additionally, shape-selective additives such as ZSM-5 may be included in the catalyst composition to increase light olefin production.

The regeneration vessel 50 is in downstream communication with the reactor vessel 20. In the regeneration vessel 50, coke is combusted from the portion of carbonized catalyst delivered to the regeneration vessel 50 by contact with an oxygen-containing gas such as air to provide regenerated catalyst. The regeneration vessel 50 may be a combustor type of regenerator, which may use hybrid turbulent bed-fast fluidized conditions in a high-efficiency regeneration vessel 50 for completely regenerating carbonized catalyst. However, other regeneration vessels and other flow conditions may be suitable. For example, the regeneration vessel 50 may be a bubbling bed type regenerator, which carries out the coke combustion in a dense fluidized bed of catalyst. In such a vessel, fluidizing combustion gas forms bubbles that ascend through a discernible top surface of a dense catalyst bed. Only catalyst entrained in the gas exits the reactor with the vapor. Cyclones above the dense bed separate the catalyst entrained in the gas and return it to the catalyst bed.

The spent catalyst conduit 48 feeds carbonized catalyst to a first or lower chamber 54 defined by outer wall 56 through a spent catalyst inlet chute 62. The carbonized catalyst from the reactor vessel 20 usually contains carbon in an amount of from about 0.2 to about 2 wt %, which is present in the form of coke. Although coke is primarily composed of carbon, it may contain from about 3 to about 12 wt % hydrogen as well as sulfur and other materials. An oxygen-containing combustion gas, typically air, enters the lower chamber 54 of the regeneration vessel 50 through a conduit 64 and is distributed by a distributor 66. As the combustion gas enters the lower chamber 54, it contacts carbonized catalyst entering from chute 62 and lifts the catalyst at a superficial velocity of combustion gas in the lower chamber 54 under fast fluidized flow conditions. The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper or second chamber 70 may be recirculated into the lower chamber 54 via an external recycle catalyst conduit 67 regulated by a control valve 69. The catalyst bed 59 defines a catalyst bed section of the regeneration vessel 50. Hot regenerated catalyst enters the lower chamber 54 through an inlet chute 63. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascends through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57.

The regeneration vessel 50 also includes an upper or second chamber 70. The mixture of catalyst particles and flue gas is discharged from an upper portion of the riser section 60 into the upper chamber 70. Substantially completely regenerated catalyst may exit the top of the transport, riser section 60, but arrangements in which partially regenerated catalyst exits from the lower chamber 54 are also contemplated. Discharge is effected through a disengaging device 72 that separates a majority of the regenerated catalyst from the flue gas. In an embodiment, catalyst and gas flowing up the riser section 60 impact a top elliptical cap 65 of the riser section 60 and reverse flow. The catalyst and gas then exit through downwardly directed discharge outlets 73 of disengaging device 72. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 70. Cyclones 82, 84 further separate catalyst from ascending gas and deposits catalyst through diplegs 85, 86 into dense catalyst bed 59. Flue gas exits the cyclones 82, 84 and collects in a plenum 88 for passage to an outlet nozzle 89 of regeneration vessel 50 and perhaps into a flue gas or power recovery system (not shown). A fluidizing conduit 74 delivers fluidizing gas, typically air, to the dense catalyst bed 59 through a fluidizing distributor 76. In a combustor-style regenerator, approximately no more than 2% of the total gas requirements within the process enter the dense catalyst bed 59 through the fluidizing distributor 76. In this embodiment, gas is added here not for combustion purposes but only for fluidizing purposes, so the catalyst will fluidly exit through the catalyst conduits 67 and 12. The fluidizing gas added through the fluidizing distributor 76 may be combustion gas. In the case where partial combustion is effected in the lower chamber 54, greater amounts of combustion gas may be fed to the upper chamber 70 through fluidizing conduit 74.

From about 10 to 30 wt % of the catalyst discharged from the lower chamber 54 is present in the gases above the outlets 73 from the riser section 60 and enter the cyclones 82, 84. The regeneration vessel 50 may typically require 14 kg of air per kg of coke removed to obtain complete regeneration. When more catalyst is regenerated, greater amounts of feed may be processed in a conventional reactor riser. The regeneration vessel 50 typically has a temperature of from about 594 to about 704° C. in the lower chamber 54 and about 649 to about 760° C. in the upper chamber 70. The regenerated catalyst conduit 12 is in downstream communication with the regeneration vessel 50 and intersects the riser 10 at a regenerated catalyst conduit intersection 90. Regenerated catalyst from dense catalyst bed 59 is transported through regenerated catalyst conduit 12 from the regeneration vessel 50 back to the reactor riser 10 through the control valve 14 where it again contacts feed as the FCC process continues.

As discussed above, the regenerated catalyst formed in the regeneration vessel 50 and fed to the reactor vessel 20 via regenerated catalyst conduit 12 may include entrained gases, such as inert gases, like nitrogen, or carbon monoxide, carbon dioxide, and/or oxygen. In the FCC unit 8 of FIG. 1, such gases are not removed from the catalyst before being fed to the reactor vessel 20.

Figure 2:
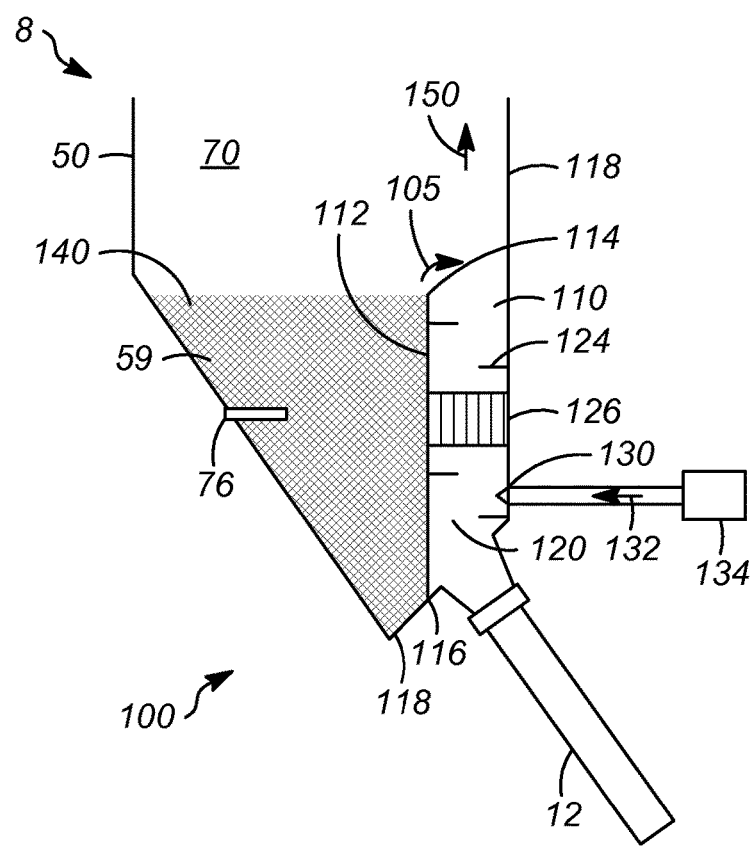
FIG. 2 is a schematic diagram of an exemplary embodiment of a separation apparatus for separating regenerated catalyst located in the regeneration vessel of FIG. 1.

FIG. 2 illustrates a portion of the FCC unit 8 of FIG. 1. The illustrated portion of the FCC unit 8 includes the catalyst bed 59 in the lower portion of second chamber 70 and the regenerated catalyst conduit 12. As shown, an apparatus 100 is provided to separate entrained gases from the regenerated catalyst (represented by arrow 105) before exiting the regeneration vessel 50 and entering the regenerated catalyst conduit 12.

As shown, a catalyst settler 110 is provided in the lower portion of second chamber 70 and physically separates the catalyst bed 59 from the regenerated catalyst conduit 12. Specifically, the catalyst settler 110 includes a wall 112 that extends from a top end 114 to a bottom end 116 that is connected to a vessel wall 118 of the regeneration vessel 50. The catalyst settler 110 defines an entrained gas separation zone 120 comprising a volume between the catalyst settler wall 112 and the vessel wall 118. As shown, the entrained gas separation zone 120 is in fluid communication with the regenerated catalyst conduit 12 leading to the reactor vessel (shown in FIG. 1).

The catalyst settler 110 may be further provided with baffles 124 and/or packing 126. As shown, the baffles 124 may be connected to the catalyst settler wall 112, the vessel wall 118, or both. While a plurality of baffles 124 are illustrated as being substantially horizontal and arranged in an alternating fashion between walls 112 and 118, the apparatus 100 may include a single baffle wall 124 or baffle walls 124 having a different orientation or orientations and/or with a different arrangement. Likewise, while the packing 126 is illustrated at an interbaffle location, the packing 126 may be provided largely coextensive with the entrained gas separation zone 120, in a plurality of sections within the entrained gas separation zone 120, or at a different location or locations within the entrained gas separation zone 120. As shown, the apparatus 100 may alternatively or additionally include an injection port 130 for injecting a gas (indicated by arrow 132) into the entrained gas separation zone 120. As shown, the injection port 130 passes through the vessel wall 118, though it is contemplated that the injection port 130 may pass through the catalyst settler wall 112 or through the regenerated catalyst conduit 12. The exemplary injection port 130 is in fluid communication with a gas source 134. In an exemplary embodiment, the gas source 134 is an inert gas source, such as a nitrogen or steam source, and the gas 132 is an inert gas, such as nitrogen or steam.

In an exemplary embodiment, the top end 114 of the catalyst settler wall 112 is near an upper surface 140 of the catalyst bed 59. As catalyst descends within the second chamber 70 and into the catalyst bed 59, the catalyst bed volume increases. As a result, the regenerated catalyst 105 overflows the catalyst bed 59, passes over the top end 114 of the catalyst settler wall 112, and descends into the entrained gas separation zone 120 of the catalyst settler 110. In the entrained gas separation zone 120, the falling regenerated catalyst 105 contacts the baffles 124 and or packing 126. At the baffles 124 and/or packing 126, the regenerated catalyst 105 is jostled or agitated, and entrained gases therein are disengaged and separated from the regenerated catalyst 105. The disengaged gases, indicated by arrow 150, may then rise through the second chamber 70 of the regeneration vessel 50.

To disengage the entrained gases, the descending regenerated catalyst 105 may be additionally or alternatively contacted by the injected gas 132 within the entrained gas separation zone 120. Contact between the injected gas 132 and the regenerated catalyst 105 causes disengagement between and separation of the entrained gases and the regenerated catalyst 105.

Figure 3:
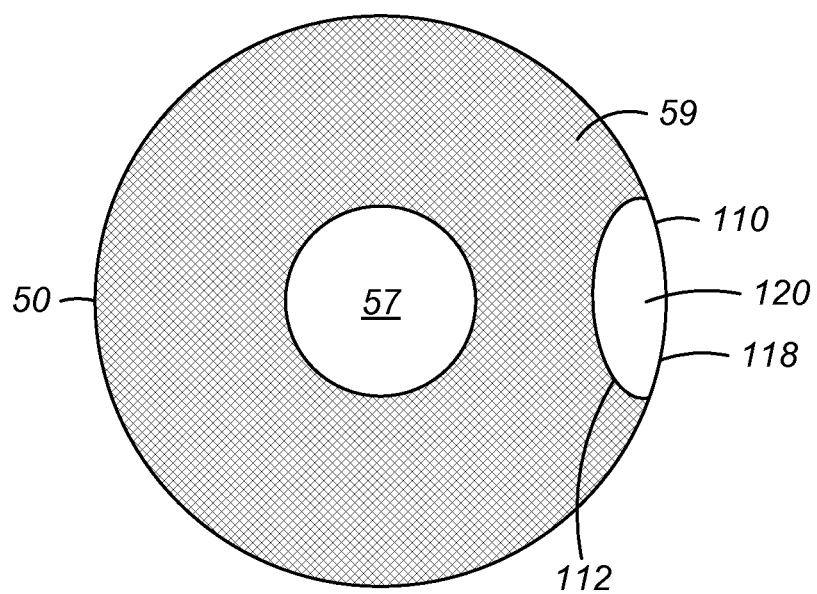
FIG. 3 is an overhead view of the separation apparatus for separating regenerating catalyst of FIG. 2 located in the regeneration vessel of FIG. 1.

FIG. 3 provides an overhead view of the catalyst settler 110 within the regeneration vessel 50. As shown, the entrained gas separation zone 120 of the catalyst settler 110 is bounded and defined by the catalyst settler wall 112 and the vessel wall 118. The catalyst settler wall 112 separates the entrained gas separation zone 120 from the surrounding catalyst bed 59. As shown, the frustoconical transition section 57 of the regeneration vessel 50 is surrounded by the catalyst bed 59.

In the exemplary embodiment, the catalyst settler wall 112 is curvilinear, i.e., arcuate. Specifically, the exemplary catalyst settler wall 112 forms part of an oval. Of course, the catalyst settler wall 112 may be provided with any desired shape to provide efficient processing at a cost effective construction cost. Further, while the exemplary catalyst settler 110 is formed partially by the vessel wall 118, it is contemplated that the catalyst settler 110 be wholly bound by a dedicated catalyst vessel wall 112, such that the vessel wall 118 does not define or contact the entrained gas separation zone 120.

Apparatuses and methods for separating regenerated catalyst have been provided herein. The embodiments described include a catalyst settler within a regeneration vessel. The exemplary catalyst settler receives regenerated catalyst overflowing from a catalyst bed. Within the catalyst settler, entrained gas is disengaged and separated from the regenerated catalyst, such as by mechanical impact with baffles and/or packing and/or through contact with an injected stream of gas. After separation, the regenerated catalyst exits the catalyst settler, and the regeneration vessel, through a regenerated catalyst conduit and may be delivered to another vessel, such as a reactor vessel. As a result, the burden on the gas concentration unit in the FCC is decreased because of the decreased volume of material processed. Further, corrosion and wear on reactor equipment may be reduced due to the removal of corrosive gases from the regenerated catalyst.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. An apparatus for separating regenerated catalyst, the apparatus comprising:
   a regeneration vessel comprising a catalyst bed section in a chamber that includes an exit to a pipe;
   a catalyst settler physically separated from the catalyst bed section by a wall extending within the regeneration vessel, wherein
      the catalyst bed section being in contact with an inside of the wall extending within the regeneration vessel; and
      the catalyst overflowing the catalyst bed section flows over the wall and enters the catalyst settler; and
   said pipe in fluid communication with the catalyst settler and configured to deliver regenerated catalyst from the regeneration vessel to another vessel.

2. The apparatus of claim 1 wherein the catalyst settler is located in the regeneration vessel.

3. The apparatus of claim 1 wherein the catalyst settler is bounded by the regeneration vessel.

4. The apparatus of claim 1 further comprising a catalyst settler baffle within the catalyst settler.

5. The apparatus of claim 1 further comprising packing within the catalyst settler.

6. The apparatus of claim 1 further comprising an injection port in the catalyst settler configured to inject a gas into the catalyst settler and into contact with the regenerated catalyst to separate entrained gas therefrom.

7. The apparatus of claim 6 further comprising a nitrogen or steam source in fluid communication with the injection port, wherein the injection port is configured to inject nitrogen or steam into the catalyst settler and into contact with the regenerated catalyst to separate entrained gas therefrom.

8. The apparatus of claim 1 wherein the wall is curvilinear.

9. The apparatus of claim 1 wherein the wall extends vertically from a top end of the catalyst bed section to a bottom end connected to the regeneration vessel.

\* \* \* \* \*